(12) United States Patent
Ezaki et al.

(10) Patent No.: US 8,477,692 B2
(45) Date of Patent: Jul. 2, 2013

(54) RADIO COMMUNICATION SYSTEM

(75) Inventors: Toshihiro Ezaki, Osaka (JP); Masaaki Higashida, Osaka (JP)

(73) Assignee: Panasonic Corporation, Osaka (JP)

( * ) Notice: Subject to any disclaimer, the term of this patent is extended or adjusted under 35 U.S.C. 154(b) by 272 days.

(21) Appl. No.: 13/055,953

(22) PCT Filed: Jul. 27, 2009

(86) PCT No.: PCT/JP2009/003514
§ 371 (c)(1),
(2), (4) Date: Jan. 26, 2011

(87) PCT Pub. No.: WO2010/013431
PCT Pub. Date: Feb. 4, 2010

(65) Prior Publication Data
US 2011/0128949 A1   Jun. 2, 2011

(30) Foreign Application Priority Data

Jul. 28, 2008  (JP) ................................. 2008-192972

(51) Int. Cl.
*H04W 84/02* (2009.01)
*H04W 16/24* (2009.01)

(52) U.S. Cl.
USPC ................ 370/328; 370/338; 455/7; 455/431

(58) Field of Classification Search
USPC .............. 370/310–392; 455/7, 17, 41.2, 297, 455/427–431; 725/74, 76
See application file for complete search history.

(56) References Cited

U.S. PATENT DOCUMENTS

| | | | | |
|---|---|---|---|---|
| 7,680,454 B2 * | 3/2010 | Mori et al. | ............. | 455/41.2 |
| 2004/0098745 A1 * | 5/2004 | Marston et al. | ............. | 725/73 |
| 2006/0075934 A1 * | 4/2006 | Ram | ............. | 108/44 |

FOREIGN PATENT DOCUMENTS

| | | |
|---|---|---|
| JP | 2-268528 | 11/1990 |
| JP | 2003-324378 | 11/2003 |
| JP | 2006-033564 | 2/2006 |
| JP | 2006-101106 | 4/2006 |

OTHER PUBLICATIONS

International Search Report issued Aug. 25, 2009 in International (PCT) Application No. PCT/JP2009/003514.

* cited by examiner

*Primary Examiner* — Afsar M Qureshi
(74) *Attorney, Agent, or Firm* — Wenderoth, Lind & Ponack, L.L.P.

(57) ABSTRACT

A radio communication system is disclosed. This system includes a wireless base station placed at an upper section of a communicating zone in a mobile unit such as an aircraft, multiple seat-rows arranged along a longitudinal direction in the communicating zone, and wireless terminals placed at each one of seats of the seat rows. Radio communication is done between the wireless base station and the wireless terminals. The wireless base station is placed on the ceiling at the forefront or at the extreme end of the communicating zone relative to the longitudinal direction of the seat rows.

12 Claims, 8 Drawing Sheets

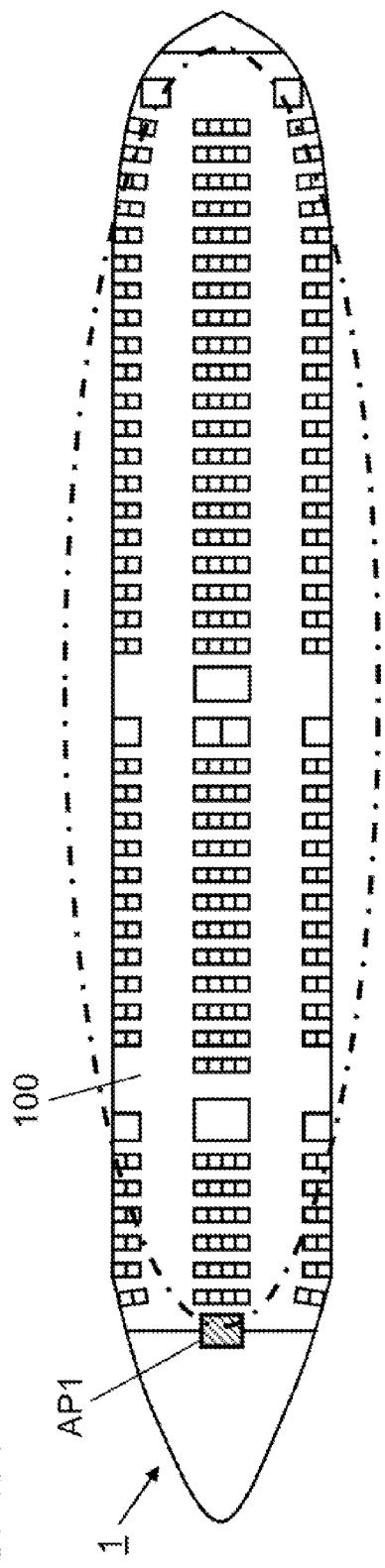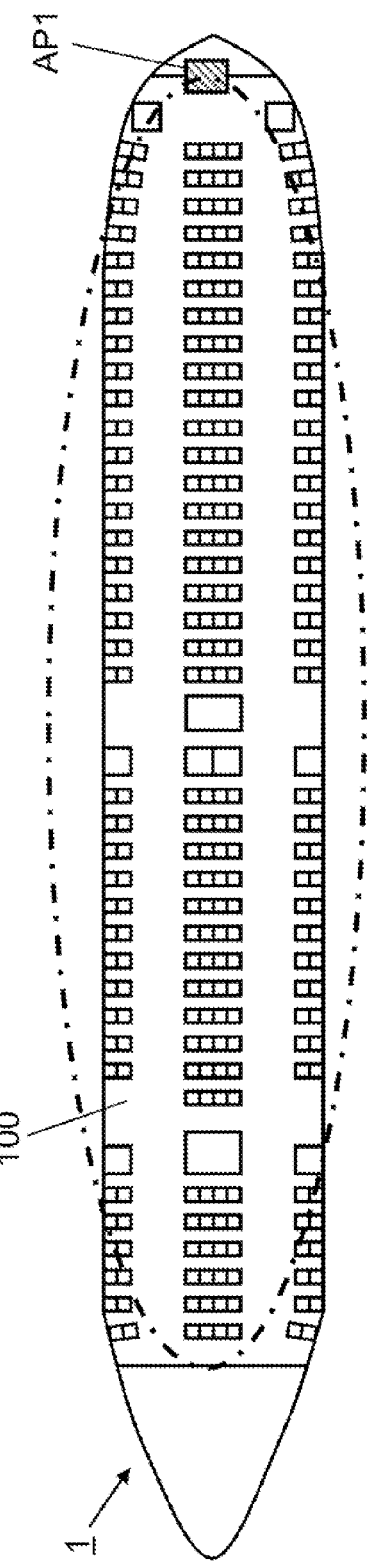
FIG. 1A
FIG. 1B

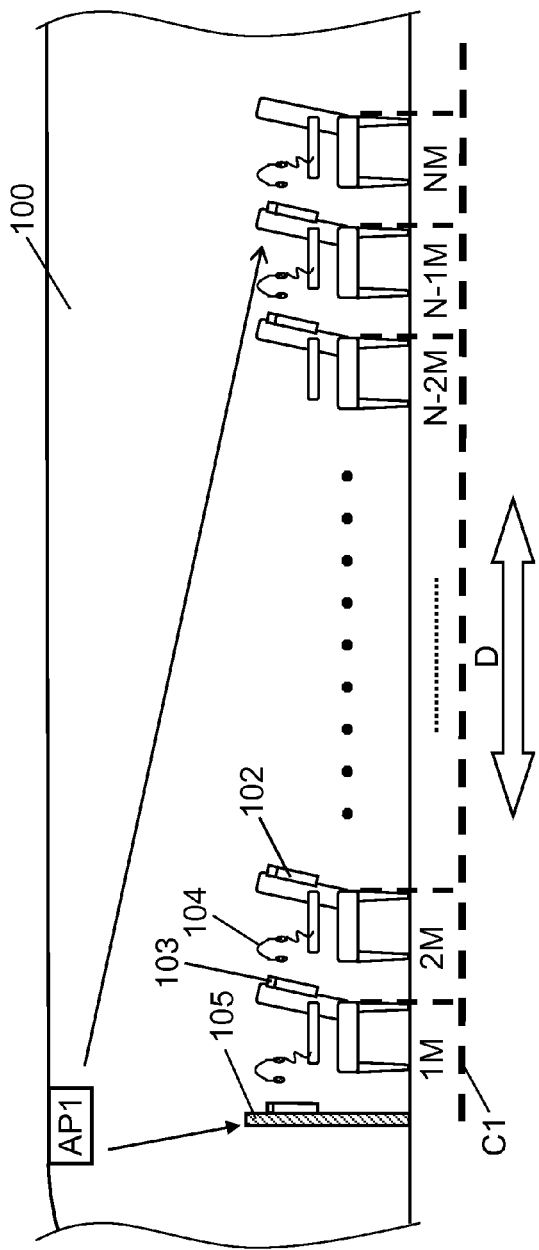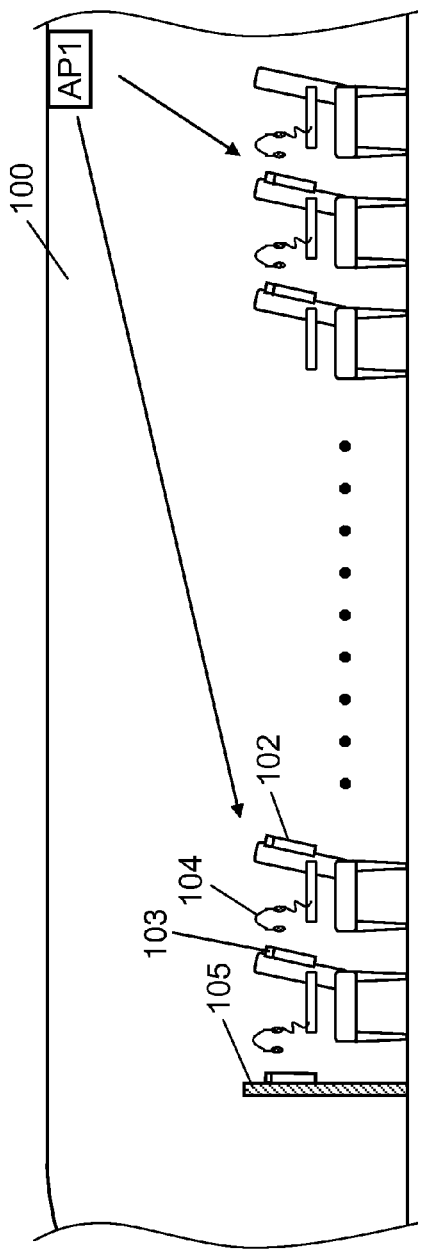
FIG. 2A
FIG. 2B

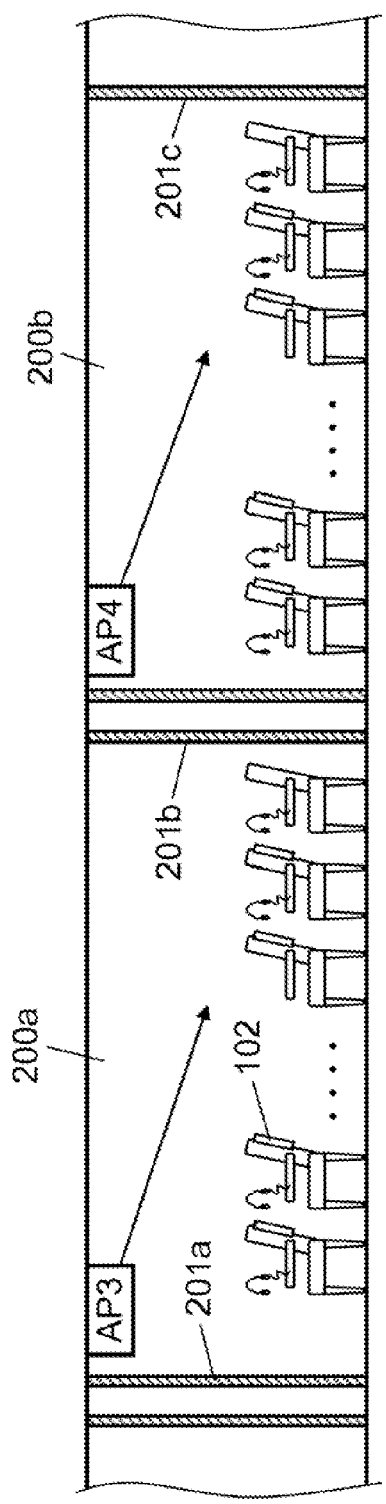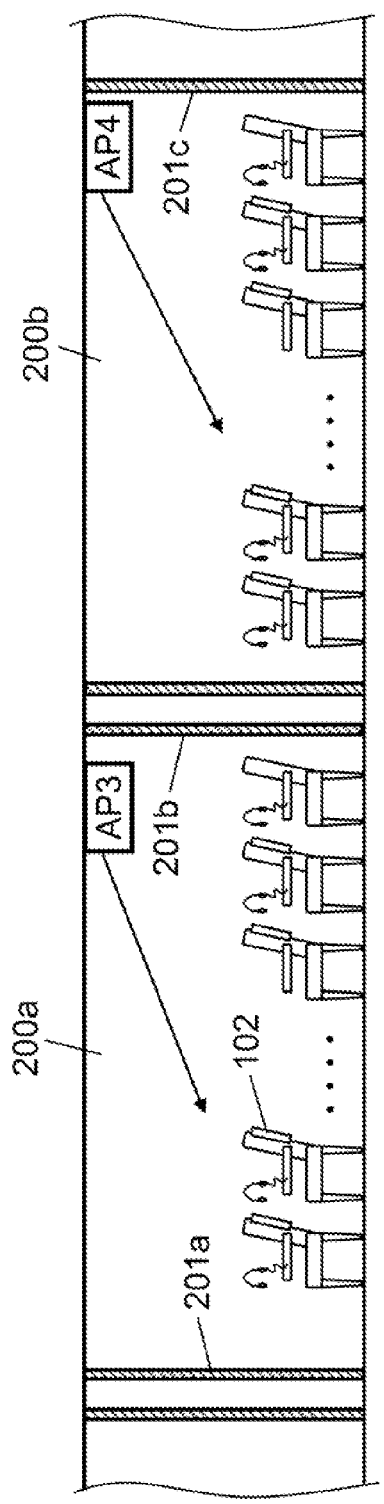

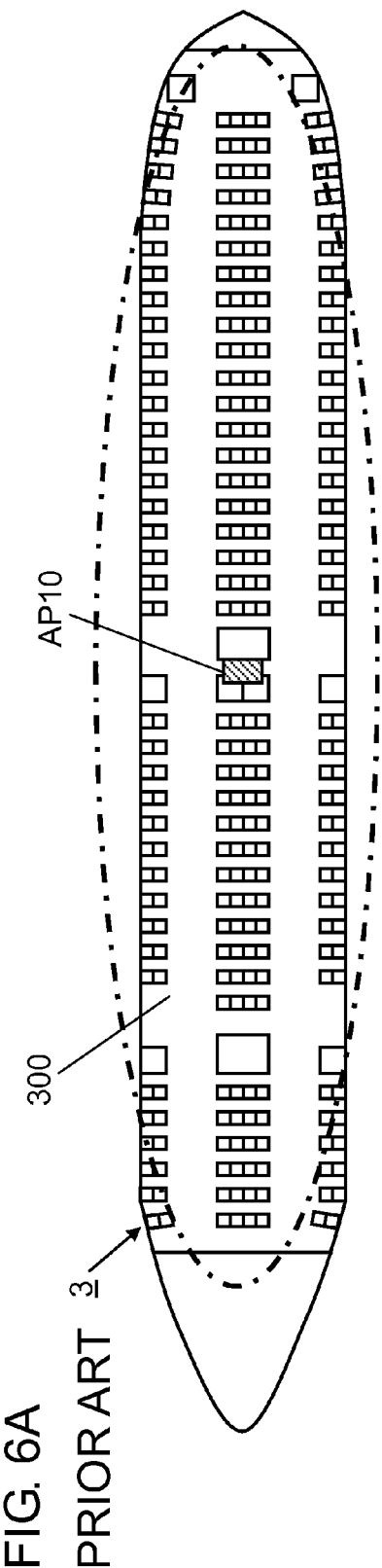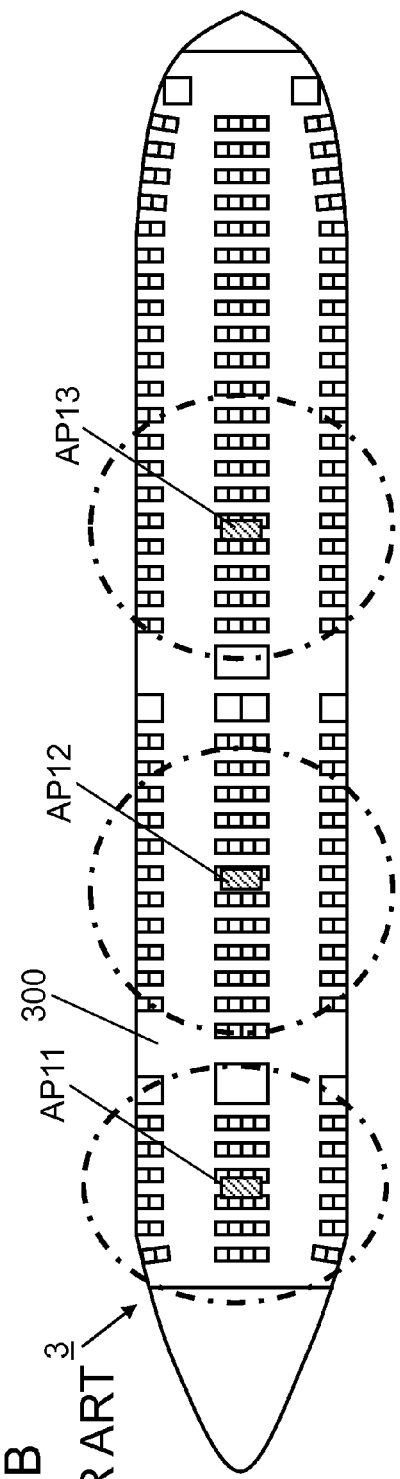
FIG. 6A PRIOR ART
FIG. 6B PRIOR ART

RADIO COMMUNICATION SYSTEM

This application is a U.S. National Stage of International Application PCT/JP2009/003514, filed Jul. 27, 2009, which claims benefit of foreign priority application JP 2008-192972, filed Jul. 28, 2008.

TECHNICAL FIELD

The present invention relates to radio communication systems available in aircraft or coaches, and more particularly it relates to radio communication systems that offer the communication of uniform and stable quality within an entire communicating zone.

BACKGROUND ART

Radio communication systems in accordance with IEEE802. 11a/b/g have prevailed in recent years. Those systems are called "wireless LAN (local area network)" and do similar jobs wirelessly to what Ethernet (registered trademark) does, which is employed in a wire-LAN system.

The wireless LAN system has been employed in portable personal computers or wireless terminals at the beginning, and then prevails in a variety of fields. For instance, to eliminate the cumbersome work of wiring cables, use of the wireless LAN system is proposed for terminals that are bound to be used within a certain limited place.

One of the foregoing instances is this: the wireless LAN system is used for distributing content, e.g. video and audio, in aircraft. (Refer to Unexamined Japanese Patent Application Publication No. 2006-33564). The wireless LAN system installed in an aircraft transmits the content to wireless terminals available at each one of passengers' seats, so that the wireless LAN system can offer information distribution service to the passengers. The distribution system comprises the following structural elements:

a server for storing the content data to be offered to the passengers;

wireless access points (hereinafter referred to as access points), i.e. wireless base stations, connected to the server and placed within the aircraft in a given number; and wireless terminals available at each one of passengers' seats.

Each one of the access points is located such that it can cover multiple wireless terminals.

FIGS. 6A and 6B are plan views of an aircraft fuselage for illustrating placement of access points of conventional radio communication systems 3 installed in the aircraft. FIG. 6A shows access point AP10 placed on the ceiling at the center of communicating zone 300 in the aircraft so that a single access point can cover all the wireless terminals mounted to every seat in the aircraft. FIG. 6B shows access points AP11, AP12, AP13, . . . , so that respective access points can cover each sub-zone produced by sub-dividing the communicating zone 300. The ovals drawn with alternate long and short dash lines in FIGS. 6A and 6B indicate arrival ranges of the radio waves transmitted from the respective access points.

FIG. 7 corresponds to FIG. 6B and shows a lateral view of the aircraft, and details the placement of access points. As shown in FIG. 7, communicating zone 300 is sub-divided into multiple sub-zones A1, A2, A3, . . . , and access points AP11, AP12, AP13, . . . , are positioned at approximate centers of respective sub-zones. Communication between the access points and each one of the passengers' seats thus can be provided.

In the foregoing case, to avoid interference between respective wireless terminals, each one of the access points is equipped with a directional antenna so that the radio wave can be transmitted to the terminals free from interference or disturbance with the other sub-zones, and a channel dedicated to the sub-zone is used between the access point and the wireless terminals within the sub-zone covered by the access point. On top of that, the channel has a different frequency from that of an adjacent sub-zone. The frequency bandwidth of the channel is time-divided, so that one access point can distribute information independently to each one of multiple wireless terminals.

Quality of the radio waves received by the wireless terminals has been improved by taking measures for a better location of the base station or better directivity of antennas installed at the receivers, thereby mitigating adverse effects of reflected waves to the communicating zone. (Refer to, e.g., Unexamined Japanese Patent Application Publication No. 2006-101106 and Unexamined Japanese Patent Application Publication No. H02-268528).

However, the access points set by the foregoing conventional methods have encountered the following problems: in the aircraft, wireless terminals are placed at the back of each seat, and the condition e.g. electric field strength, of radio waves received by the wireless terminals differs depending on the relative locations of the seats to the access point. The receipt qualities at the respective seats are thus unstable.

FIG. 8 shows wireless terminals 102 placed at the back of the respective seats, and each wireless terminal 102 includes an LCD and antenna 103, which is located not on the seat but on the rear of the backrest, because the design and function are taken into account.

In a case, where an access point AP is placed at the center of a communicating zone including seat-line SL in the interior space of the aircraft, the receiving environments of wireless terminals 102 differ depending on location F of access point AP (hereinafter referred to as AP location F) relative to longitudinal direction D of seat-line SL. Wireless terminals 102 placed ahead of AP location F receive direct waves W1 and W2 from access point AP, while wireless terminals 102 placed behind AP location F cannot receive the direct waves W1, W2 but receive indirect waves, i.e. transmitted waves W3, W4, and reflected wave W5.

The receipt condition of wireless terminals 102 thus differs greatly depending on the locations of terminals 102, i.e. ahead of AP location F or behind AP location F. In other words, the receipt condition greatly changes between a direct-wave area and an indirect-wave area. If the direct waves and the indirect waves are mixed together in the same communicating space, each one of the seats has a different receiving environment of the radio waves. In the case of aircraft, in particular, different from ordinary spaces such as an office space, the setting location is limited, and the devices of the system cannot be readily moved to get a better radio-wave environment. The radio communication system in the aircraft thus should find a uniform radio environment even a little better. If there is a need for changing antennas, an approval of the authorities is required for this change, so that it is hard to change antennas embedded at respective seats.

The problems discussed above need some measures to make the receipt quality of radio-wave uniform within the communication system; however, taking the measures invites the complexity of the system. Solving these problems is thus critical for operating the system.

SUMMARY OF THE INVENTION

A radio communication system of the present invention comprises the following structural elements:
- a wireless base station disposed at an upper section of a communicating space within a mobile unit;
- multiple seat-rows arranged along the longitudinal direction in the communicating space; and
- wireless terminals each of which is disposed at the back of each one of the seats forming the seat-rows.

Radio communication is carried out between the base station and the terminals, and the base station is disposed at the forefront or at the extreme end of the communicating space relative to a longitudinal direction of the seat-rows.

The structure discussed above allows the wireless base station disposed at the forefront or the extreme end of the communicating space to transmit radio-wave, thereby communicating wirelessly with the wireless terminals disposed at the respective seats. The radio communication thus can be provided for all the terminals of the seats within the communicating zone with either one of direct waves or indirect waves free from the mixture thereof. In other words, a single access point is placed within the communicating zone, and all the seats have the same receipt condition, and then receivers of the same performance can be used at all the seats. As a result, a radio communication system, which can offer stable, quality, and simplified radio communication service, is obtainable.

BRIEF DESCRIPTION OF THE DRAWINGS

FIG. 1A is a plan view of a fuselage of an aircraft, and illustrates a placement of an access point (placed forward of all the seats) of a radio communication system in accordance with a first embodiment of the present invention.

FIG. 1B is a plan view of a fuselage of an aircraft, and illustrates a placement of an access point (placed at the extreme end—rearward—of all the seats) of a radio communication system in accordance with the first embodiment of the present invention.

FIG. 2A is a lateral view illustrating more in detail the placement of the access point (placed foreward of all the seats) in accordance with the first embodiment.

FIG. 2B is a lateral view illustrating more in detail the placement of the access point (placed rearward of all the seats) in accordance with the first embodiment.

FIG. 4A is a lateral view illustrating more in detail the placement of the access points (placed at the front of each one of the sub-divided zones) of the radio communication system in accordance with the second embodiment.

FIG. 4B is a lateral view illustrating more in detail the placement of the access points (placed at the rear of each one of the sub-divided zones) of the radio communication system in accordance with the second embodiment.

FIG. 6A is a plan view of a fuselage of an aircraft, and illustrates a placement of an access point (placed on the ceiling at the center of the communicating zone) of a conventional radio communication system.

FIG. 6B is a plan view of a fuselage of an aircraft, and illustrates a placement of access points (placed in each one of multiple sub-zones) of the conventional radio communication system.

PREFERRED EMBODIMENTS OF THE INVENTION

Exemplary embodiments of the present invention are demonstrated hereinafter with the radio communication system installed in an interior space of an aircraft, an example of the means of transportation, which is shielded electromagnetically from the outside.

Exemplary Embodiment 1

Radio communication system 1 (hereinafter simply referred to as system 1) in accordance with the first embodiment is demonstrated hereinafter with reference to FIGS. 1A, 1B, 2A, and 2B. FIGS. 1A and 1B are plan views of a fuselage of an aircraft, and illustrate placement of an access point of system 1 in accordance with the first embodiment of the present invention. FIGS. 2A and 2B are lateral views illustrating more in detail the placement of the access point in the aircraft.

As shown in FIGS. 1A and 1B, system 1 has access point AP1 at the extreme front end (FIG. 1A) or at the extreme rear end (FIG. 1B) of all the seats. The radio wave transmitted from access point AP1 is receivable within the oval drawn with an alternate long and short dash line.

Communicating zone 100 available in the interior space of the aircraft is a communicating space of system 1 and constitutes the entire interior space. In communicating zone 100, there are three seats at the center, two seats on the right of the center seats with an aisle in between, and two seats on the left of the center seats with another aisle in between. These seven seats in one row are handled as one unit, and N rows (1M, 2M, 3M, ..., NM) are arranged in a longitudinal direction. Access point AP1, working as a wireless base station, is placed on the ceiling at the extreme front end (FIG. 2A) or at the extreme rear end (FIG. 2B) of communicating zone 100 relative to longitudinal direction D of the seat-rows. This first embodiment thus employs only one access point in the entire aircraft. Access point AP1 is connected via wires to a server (not shown) which distributes audio and video information to wireless terminals 102, whereby a wireless LAN system is formed. The server thus can cover the entire communicating zone 100 via access point AP1, and can distribute information to each one of terminals 102.

Figure 8:
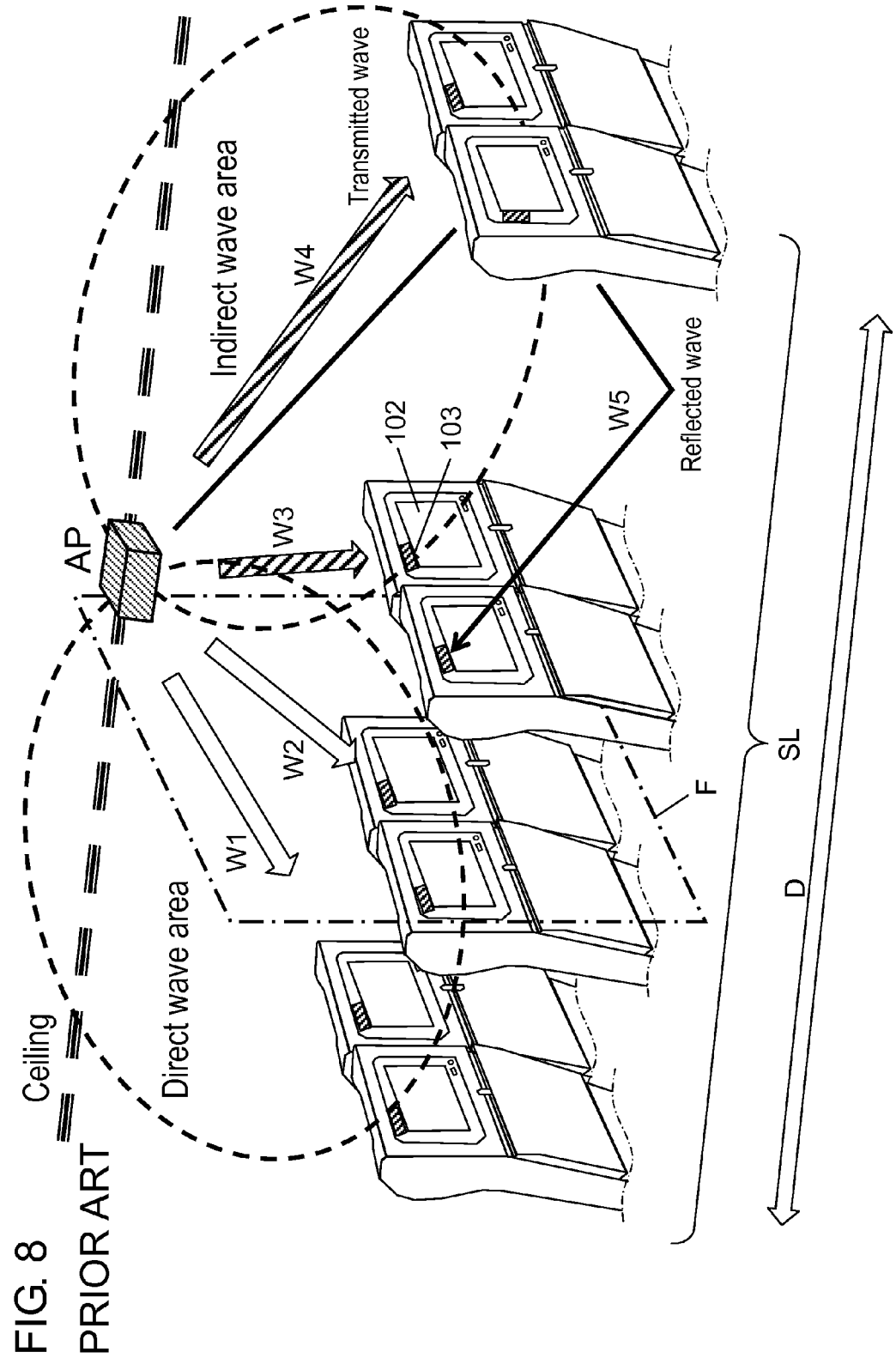
FIG. 8 is a perspective view of a radio-wave environment widely used in the conventional radio communication systems.

Passengers in the respective seats use wireless terminals 102 placed on the back of the seats immediately before them. For the passenger on the front-most seat, terminal 102 is placed on partition board 105. Terminal 102 includes antenna 103 (shown in FIG. 8), and the passengers watch video information displayed on LCDs and distributed from the server via access point AP1. Terminals 102 connect with Ethernet (registered trademark) C1 that is placed under the floor and used for controlling purpose, and provide the passengers via earphones 104 with audio information supplied from audio-output sections embedded at the seats.

Next, the functions and advantages, the gist of the present invention, achieved by positioning access point AP1, are demonstrated hereinafter with reference to FIGS. 1A, 1B, 2A, and 2B.

System 1 includes access point AP1, working as a wireless base station, on the ceiling and ahead of the front-most seat (FIG. 2A) or behind the rear-most seat (FIG. 2B) in communicating zone 100. The ceiling in this context refers to either the underside (facing the interior as shown in FIGS. 2A and 2B) or the top face (not shown) of the ceiling board. In a case, where access point AP1 is placed on the top face of the ceiling board, the radio waves from AP1 travel through the ceiling board and arrive at terminals 102. In this case, the receipt environments of terminals 102 stay uniform throughout the communicating zone 100. This is different from the case discussed previously in connection with FIG. 8, where the receipt environments differ from each other because the access point is placed at the center of the communicating zone (interior space) having seat-lines SL.

For instance, in the case where access point AP1 is placed at the extreme front end of communicating zone 100 (shown in FIG. 2A), radio communication can be provided for all the terminals 102 in communicating zone 100 with only indirect waves free from direct waves mixed. The passengers in all seats thus can receive the radio waves from access point AP1 via wireless terminals 102 in the same receipt condition, so that terminals 102 of the same performance can be used in every seat.

For instance, antennas 103 embedded at respective seats need different designs in directivity and sensitivity relative to a plane of polarization or complicated tunings in order to obtain optimized receipt performance with respect to both of the direct and indirect waves of the radio waves transmitted from access point AP1. However, since this system 1 receives only the indirect waves as discussed previously, there is no need for different designs or complicated tunings. To be more specific, antennas 103 can be adjusted to have directivity along the arriving indirect waves. Depending on the radio-wave environment (radio-wave reflection on the galleys or the windows), the receipt sensitivity of antenna 103 can be improved by controlling the plane of polarization of the radio waves transmitted from access point AP1. For instance, if there are many reflective walls installed vertically relative to the floor in the interior space, use of vertical polarization allows receiving information at the higher sensitivity.

On top of that, there is no need for the main bodies of wireless terminals 102 to prepare individual settings for amplifier gain or to take corrective actions to communication errors individually. The use of only the indirect waves as the receipt radio-wave at each one of the seats in the aircraft allows for simple designing of antenna 103 and wireless terminal 102, and also allows for saving of a lot of time and labor for adjustment.

Parameters of access point AP1 can be set to satisfy the receipt conditions for both of the direct waves and the indirect waves, so that the system can be operated more efficiently.

In the case of placing access point AP1 at the extreme rear end (FIG. 2B) of communicating zone 100, the radio communication can be provided to every terminal 102 placed in zone 100 with only the direct waves free from the indirect waves mixed. This structure achieves the same advantage as that of the case where AP1 is placed at the extreme front end of zone 100.

The first embodiment, as discussed above, proves that a quality and simplified radio communication system having a single access point available in an aircraft can offer stable radio communication in the entire aircraft. On top of that, this system can be built at a lower cost and operated at with lower running costs.

Exemplary Embodiment 2

Figure 3A:
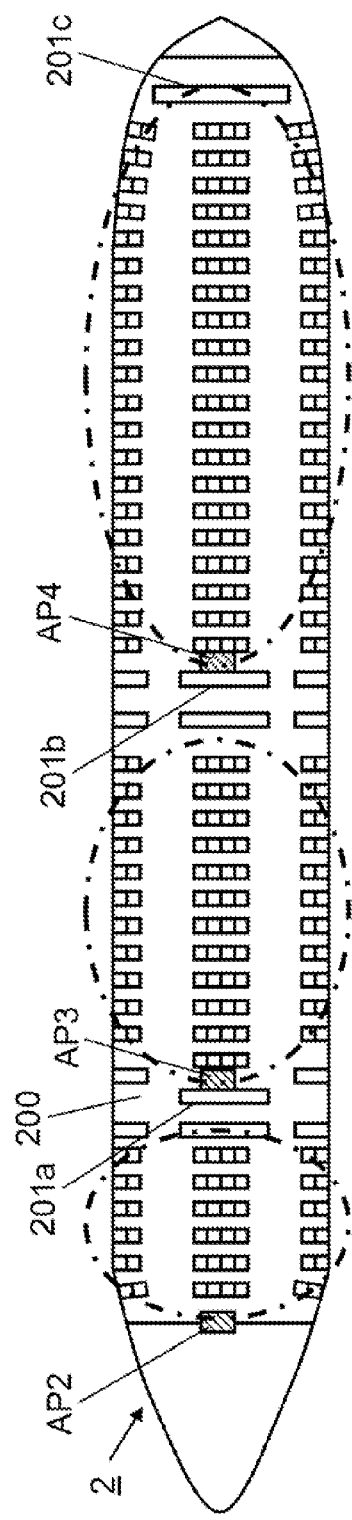
FIG. 3A is a plan view of a fuselage of an aircraft, and illustrates a placement of access points (placed at the front of each one of sub-divided zones) of a radio communication system in accordance with a second embodiment of the present invention.
Figure 3B:
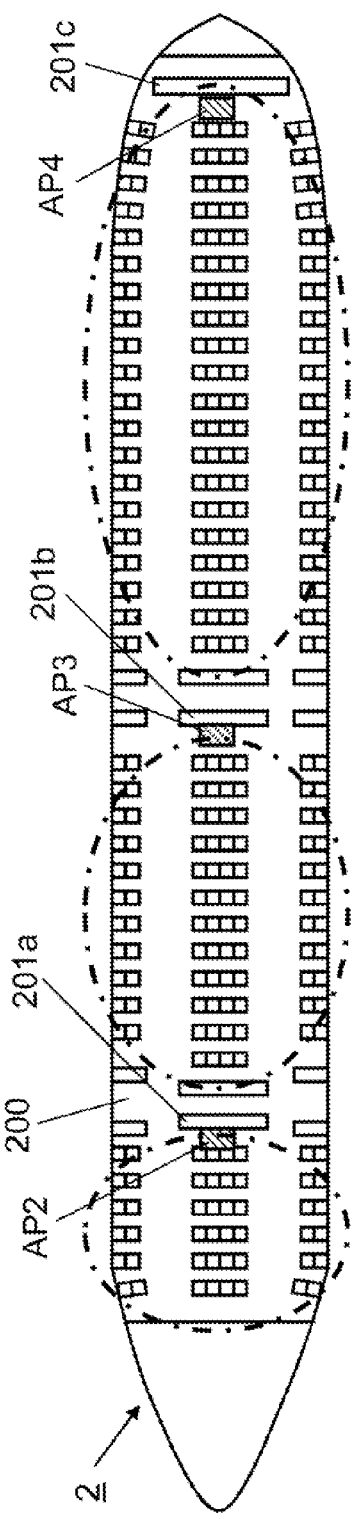
FIG. 3B is a plan view of a fuselage of an aircraft, and illustrates a placement of access points (placed at the rear of each one of the sub-divided zones) of a radio communication system in accordance with the second embodiment.

Radio communication system 2 (hereinafter simply referred to as system 2) in accordance with the second embodiment is demonstrated hereinafter with reference to FIGS. 3A, 3B, 4A, and 4B. FIGS. 3A and 3B are plan views of a fuselage of an aircraft, and illustrate a placement of access points of system 2 in accordance with the second embodiment of the present invention. FIGS. 4A and 4B are lateral views illustrating more in detail the placement of the access points in the aircraft.

As shown in those drawings, communicating zone 200 is sub-divided into three sub-zones by galleys 201a, 201b (the galley is detailed later) and wall 201c. Access points AP2, AP3, and AP4 are placed at the extreme front end (FIG. 3A) or at the extreme rear end (FIG. 3B) of each sub-zone.

As FIGS. 3A, 3B, 4A, and 4B show, the seat-rows in communicating zone 200 are divided by partitions 201a, 201b, and 201c into sub-zones 200a and 200b. Access points AP3 and AP4, working as wireless base stations, are placed on the ceiling at the extreme front end or the extreme rear end of sub-zone 200a and sub-zone 200b respectively.

The aircraft includes three interior spaces for first class, business class, and economy class, and the three interior spaces are separated from each other with the galleys where flight attendants prepare drinks or foods. The galleys are generally formed of metallic material, which obstructs travel of the radio waves, so that each one of the interior spaces is electromagnetically shielded. The foregoing three interior spaces are referred to as the sub-zones, and galleys 201a, 201b and wall 201c are referred to as partitions. The access points are placed at the extreme front ends of sub-zones 200a and 200b or they are placed at the extreme rear ends of sub-zones 200a and 200b.

For instance, access point AP3 is placed on the ceiling at the front-most seat-row of sub-zone 200a, and access point AP4 is placed on the ceiling at the front-most seat-row of sub-zone 200b as shown in FIG. 4A. This configuration allows wireless terminals 102 placed at all the seats to receive only the indirect waves, so that the receipt condition can be unified.

Access point AP3 is placed on the ceiling at the rear-most seat-row of sub-zone 200a, and access point AP4 is placed on the ceiling at the rear-most seat-row of sub-zone 200b as shown in FIG. 4B. This structure allows wireless terminals 102 placed at every seat to receive only the direct waves. The receipt condition can be thus unified.

The second embodiment thus proves that system 2 installed in the aircraft, of which communicating zone 200 is divided into multiple sub-zones by the galleys, can achieve the same advantage as the first embodiment does.

Exemplary Embodiment 3

Figure 5A:
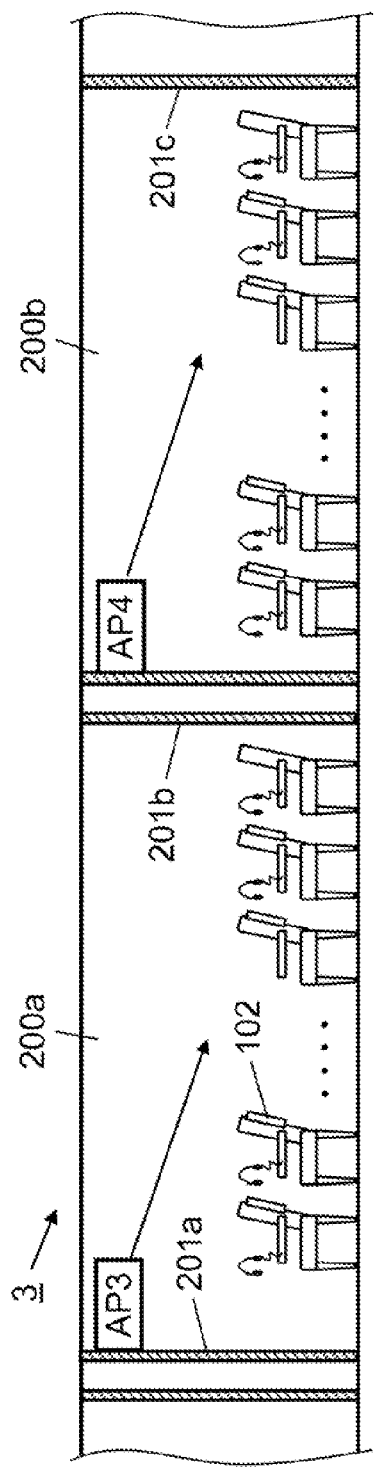
FIG. 5A is a lateral view detailing a placement of access points (placed on the walls of galleys) of a radio communication system in accordance with a third embodiment of the present invention.
Figure 5B:
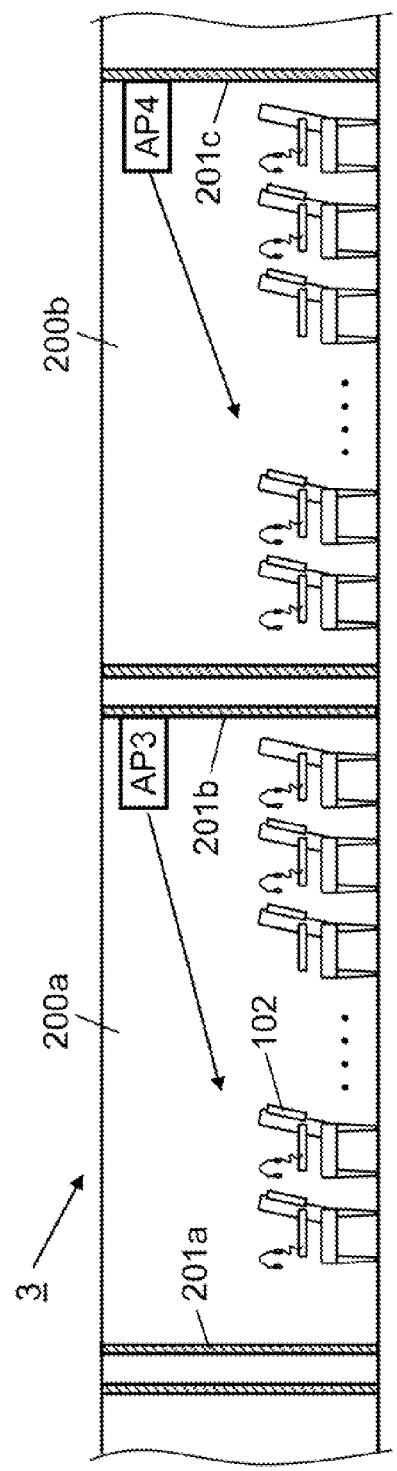
FIG. 5B is a lateral view detailing a placement of access points (placed on the wall of a galley and on the wall of the extreme rear end) of a radio communication system in accordance with the third embodiment.
Figure 7:
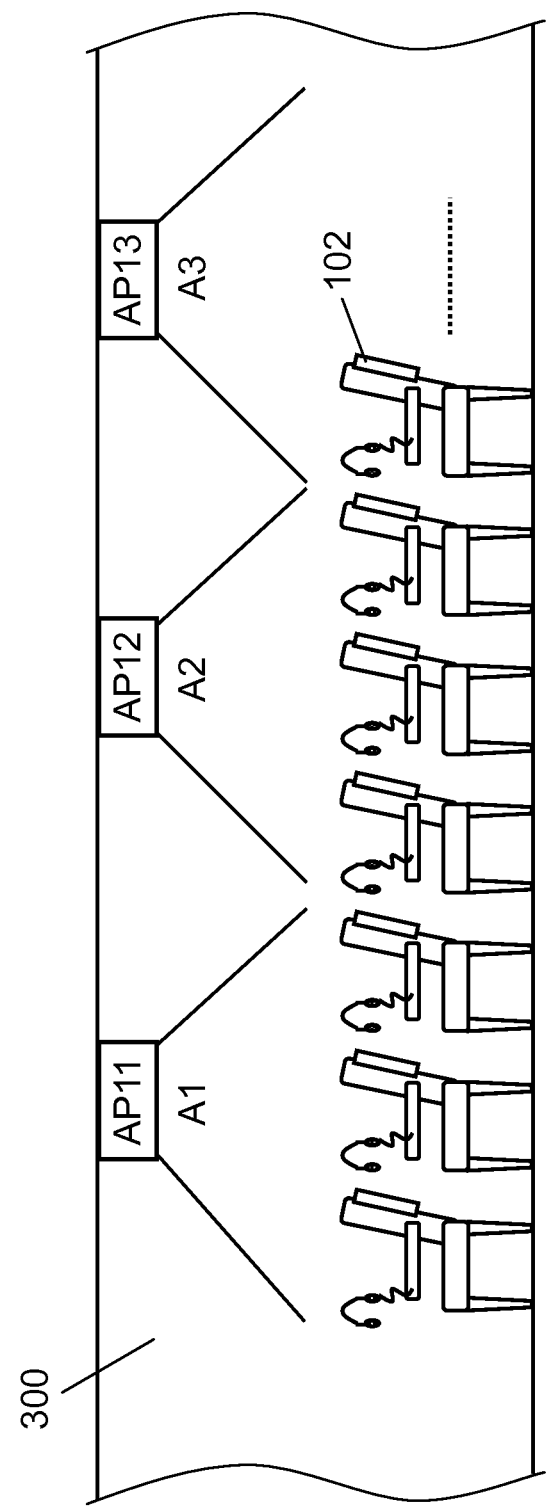
FIG. 7 is a lateral view of a structure widely used in the conventional radio communication systems.

Radio communication system 3 (hereinafter simply referred to as system 3) in accordance with the third embodiment is demonstrated hereinafter with reference to FIGS. 5A and 5B, which are lateral views illustrating the placement in detail of access points in an aircraft. The third embodiment differs from the second embodiment in the locations of access points AP3 and AP4. To be more specific, access points AP3 and AP4 in accordance with the second embodiment are placed on the ceiling; however, in this third embodiment access points AP3 and AP4 of system 3 are placed on the walls of galleys 201a and 201b (FIG. 5A) near to the ceiling, or they are placed on wall 201c at the extreme rear ends (FIG. 5B) also near to the ceiling.

The foregoing placement of the access points allows for unifying of the receipt condition for terminals 102 embedded at all the seats in sub-zones 200a and 200b in the same manner as the second embodiment. To be more specific, in the case of placing the access points on galleys 201a and 201b, every terminal 102 in sub-zones 200a and 200b receives the indirect waves as shown in FIG. 5A. In a similar way, the access points placed on galley 201b and wall 201c at the extreme rear end allows every terminal 102 in sub-zones 200a and 200b to receive the direct waves as shown in FIG. 5B. The placement of the access points not only on the ceiling but also on the walls of galleys or the wall of interior space increases the choice of placement locations, so that placement in a better condition can be achieved. A combination of placing the access points on the ceiling, galleys, and wall can be expected.

Access point AP1 in accordance with the first embodiment can be placed on the extreme front wall or the extreme end wall of the interior space achieving a similar advantage to what was discussed previously.

The present invention, as discussed above, unifies the receipt conditions of the radio waves transmitted from the access point for all the seats in a mobile unit, so that wireless terminals of the same performance and antennas of the same specification can be used in all the seats. The radio communication system of the present invention thus can be built at a lower cost and operated with lower running costs. On top of that, this system has a simple structure, achieves high quality, and offers steady information service.

The present invention can be advantageously used in an aircraft among others because the aircraft has a limited space which obliges the access points to be placed in a confined manner, or the present invention can be advantageously used in a case where the number of access points is limited due to cost, or in a case where it is difficult to adjust the characteristics of the wireless terminals embedded at each seat.

The present invention can be applied to radio communication systems that offer information distribution services within spaces electromagnetically shielded, e.g. an interior space of an aircraft.

The invention claimed is:

1. A radio communication system comprising:
a mobile unit having a passenger compartment constituting a communicating apace;
a plurality of seat rows arranged along a longitudinal direction in the communicating space, each of said seat rows having a plurality of passenger seats, one of said seat rows constituting a front-most seat row of the passenger compartment with no seat row disposed forwardly thereof in the passenger compartment, and another one of the seat rows constituting a rear-most seat row of the passenger compartment with no seat vow deposed rearwardly thereof in the passenger compartment;
a wireless terminal disposed at a back of each of the seats of each of the seat rows other than the seats of the rear-most seat row, the wireless terminals at the backs of the seats of the seat row immediately forward of the rear-most seat row constituting rear-most wireless terminals of the passenger compartment; and
a wireless base station disposed in an upper section of the communicating space;
wherein each of the wireless terminals is configured for radio communication with the wireless base station; and
wherein the wireless base station is disposed forward of the front-most seat row of the passenger compartment or rearward of the rear-most wireless terminals of the passenger compartment.

2. The radio communication system of claim 1, wherein the communicating space is divided along the longitudinal direction into first and second sub-spaces by a radio-wave-obstructing partition;
the first sub-space has a plurality of the seat rows therein including a front-most seat row backs of the seats of the seat row immediately forward of the rear-most seat row of the first sub-space constituting rear-most wireless terminals of the first sub-space;
the second sub-space has a plurality of the seat rows therein including a front-most seat row of the second sub-space and a rear-most seat row of the second sub-space, the wireless terminals at the backs of the seats of the seat row immediately forward of the rear-most seat row of the second sub-space constituting roar-most wireless terminals of the second sub-space;
the wireless base station constitutes a first wireless base station of a pair of first and second wireless base stations, both of said first and second wireless base stations being disposed in the upper section of the communicating space;
said first wireless base station is disposed in the first sub-space, and a second wireless base station is disposed in the second sub-space; and
the second wireless base station is disposed forward of the front-most seat row of the second sub-space or rearward of the rear-most terminals of the second sub-space.

3. The radio communication system of claim 2, wherein the radio-wave-obstructing partition is a galley or a wall.

4. The radio communication system of claim 3, wherein each of the first and second wireless base stations is disposed on one of the ceiling, the galley, and the wall of a respective one of the first and second sub-spaces.

5. The radio communication system of claim 2, wherein the first wireless base station constitutes a single wireless base station that is located to communicate with all of the wireless terminals in the first sub-space, with no other wireless base station being provided in the first sub-space.

6. The radio communication system of claim 5, wherein the second wireless base station constitutes a single wireless base station that is located to communicate with all of the wireless terminals in the second sub-space, with no other wireless base station being provided in the second sub-space.

7. The radio communication system of claim 1, wherein each of the wireless terminals has an antenna which is disposed at a rear side of a backrest of the seat.

8. The radio communication system of claim 7, wherein each of the antennas has directivity.

9. The radio communication system of claim 1, wherein the wireless base station is disposed on a ceiling of the communicating space.

10. The radio communication system of claim 1, wherein the mobile unit is an aircraft.

11. The radio communication system of claim 1, wherein the wireless base station constitutes a single wireless base station that is located to communicate with all of the wireless terminals in the passenger compartment, with no other wireless base station being provided in the passenger compartment.

12. The radio communication system of claim 1, wherein
the communicating space is divided along the longitudinal direction into first, second and third sub-spaces by first and second radio-wave-obstructing partitions;
the first sub-space has a plurality of the seat rows therein including a front-most seat row of the first sub-space and a rear-most seat row of the first sub-space, the wireless terminals at the backs of the seats of the seat row immediately forward of the rear-most seat row of the first sub-space constituting rear-most wireless terminals of the first sub-space;
the second sub-space has a plurality of the seat rows therein including a front-most seat row of the second sub-space and a rear-most seat row of the second sub-space, the wireless terminals at the backs of the seats of the seat row immediately forward of the rear-most seat row of the second sub-space constituting rear-most wireless terminals of the second sub-space;
the third sub-space has a plurality of the seat rows therein including a front-most seat row of the third sub-space and a rear-most seat row of the third sub-space, the wireless terminals at the backs of the seats of the seat row immediately forward of the rear-most seat row of the third sub-space constituting rear-most wireless terminals of the third sub-space;
the wireless base station constitutes a first wireless base station of a trio of first, second and third wireless base stations, all of said first, second and third wireless base stations being disposed in the upper section of the communicating space;
said first wireless base station is disposed in the first sub-space, the second wireless base station is disposed in the second sub-space, and the third wireless base station is disposed in the third sub-space;
the second wireless base station is disposed forward of the front-most seat row of the second sub-space or rearward of the rear-most terminals of the second sub-space; and
the third wireless base station is disposed forward of the front-most seat row of the third sub-space or rearward of the rear-most seat row terminals of the third sub-space.

\* \* \* \* \*